UNITED STATES PATENT OFFICE.

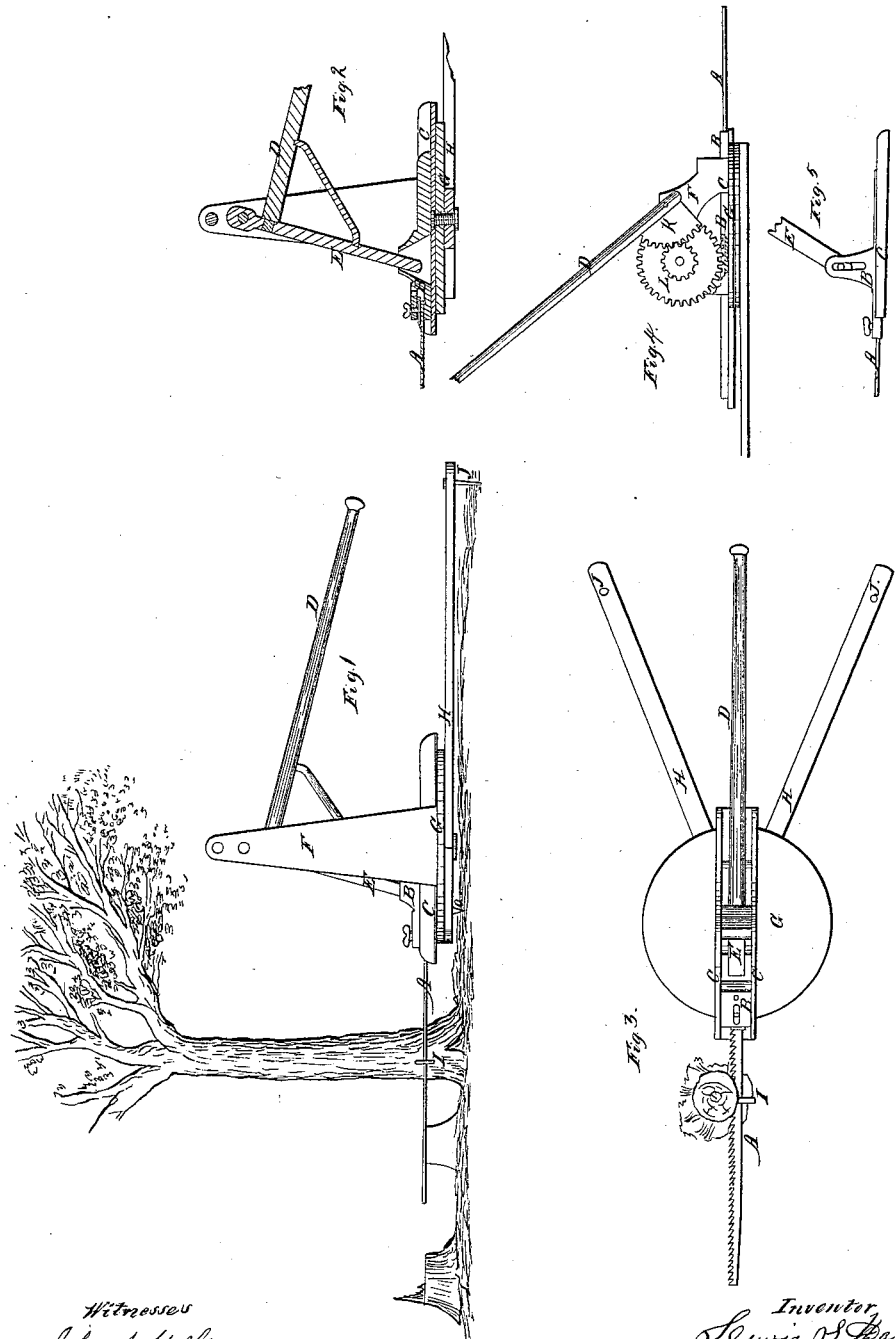

LEWIS S. HAYES, OF GREENE, NEW YORK.

IMPROVEMENT IN SAWING-MACHINES.

Specification forming part of Letters Patent No. 59,392, dated November 6, 1866.

*To all whom it may concern:*

Be it known that I, LEWIS S. HAYES, of Greene, in the county of Chenango and State of New York, have invented a new and useful Improvement in Apparatus for Felling Trees; and I do hereby declare the following to be a full, clear, and exact description of the same, reference being had to the accompanying drawings, in which—

Figure 1 is a side elevation, representing my apparatus as ready for operation. Fig. 2 is a vertical longitudinal section of the same. Fig. 3 is a plan view of the same. Figs. 4 and 5 are elevations of machines with modified modes of operation.

My invention consists in a simple and effective method of reciprocating a saw horizontally and very near the ground for the purpose of felling trees more readily and economically than by the hand-ax.

That others may understand its construction and operation, I will particularly describe it.

A is the saw set in a frame or slide, B, which reciprocates between guides C. The slide B is caused to reciprocate by means of the hand-lever D, operating through the medium of a rock-shaft, E, or other suitable devices, as in Fig. 4.

The hand-lever D may be centered or pivoted between two standards, F, rising from the side of the guides C, and forming a part of the general bed and frame of the machine. The construction and operation of this part of the machine will be apparent at a glance if Figs. 1 and 2 are referred to.

The saw used should be thin on the back, and should have a coarse set, so as not to pinch in the cut if the tree should incline a little toward the cut. A set-screw or other suitable and convenient device is used to secure the saw to the slide B.

Friction-rollers may be inserted in the edges of the slot, into which the lower end of the rock-shaft enters to reduce friction at that point, if it is deemed necessary.

The saw-guides are mounted upon the turn-table G, which is pivoted to the frame or bed H, so that, as the cut progresses, the saw is moved to its work by the turning of the table G, and this is constantly effected by pressing against the lever D while moving it up and down.

When the cut is commenced, a staple, I, is driven into the side of the tree as a support and guide for the outer end of the saw until it has fairly entered the tree. Spikes J are set in the under side of the frame H, to prevent it from slipping on the ground during operation.

When the machine is adapted only to the cutting down of small trees, so that a long stroke of the saw may be made, it may be operated by a train of gearing, K and L, as in Fig. 4, by means of which the stroke of the saw may be greatly increased without any increase of motion of the moving power.

This machine may be adapted to the cutting off of logs by arranging the saw to feed vertically.

What I claim as new, and desire to by Letters Patent, is—

The combination of the saw A, slide B, guides C, lever D, and turn-table G, constructed and operating substantially as and for the purpose set forth.

In testimony whereof I hereunto subscribe my name on this 5th day of June, 1866.

LEWIS S. HAYES.

Witnesses:
 CHAS. GRAY,
 MERITT S. PARKER.